United States Patent Office 2,900,300
Patented Aug. 18, 1959

2,900,300

METHOD AND COMPOSITION FOR PACIFYING BEES

Stewart R. Taylor, Oakwood, Ill.

No Drawing. Application April 4, 1955
Serial No. 499,215

6 Claims. (Cl. 167—39)

This invention relates to a method and composition for pacifying bees preparatory to inspecting or robbing beehives. More particularly the composition comprises a pressurized package from which a mist or spray of liquid but finely divided particles can be dispensed which sufficiently simulate the odor of smoke or at least the effect that smoke has on bees, which is given off from the combustion of wood, straw, burlap or similar vegetable matter to cause the bees to react as hereinafter described.

It has long been observed that bees react to smoke as if they feared that their hives may soon catch fire. In general, they become more concerned by the imminence of fire than by the presence of the beekeeper, thus making it possible for him to manipulate the hive or remove the honey therefrom with a minimum danger of being stung. Individually, the bees seem to react to smoke by gulping the honey in order to transport as much of it as possible to a new location in the event their hives should actually catch fire. The honey and/or nectar gorges the individual bee's digestive tract and they become sluggish. The organs controlling the stinger appear to be cramped so that their ability to sting is for the time being impaired. Even ungorged bees, such as "guard" bees or those flying, seem to be driven back by smoke odors. As a consequence, the bees are less apt to sting the beekeeper than when no smoke is employed. Consequently, beekeepers have long used methods of applying smoke to the bees which involve the actual combustion of wood or other organic material and blowing the resultant smoke into the hive, for example, with a bellows.

I have found that the same effect can be produced by means of a composition which simulates the odor of smoke sufficiently to cause the bees to react in the above described manner. It lacks the $CO_2$, $CO$, $H_2O$ and charcoal content that comprise the bulk of natural smoke. I employ a smoke-odor simulating composition which is dissolved in a suitable solvent-propellant which is normally gaseous at atmospheric temperature and pressure, but which can be maintained in a liquefied state when confined at atmospheric temperature under its own vapor pressure. When this composition is released through a suitable atomizing nozzle by the actuation of a valve, it can be sprayed in the form of a mist with the resultant simulation of smoke-odor. When I refer to "smoke-simulation composition," I refer to the odors or compositions which produce the effect on bees that is produced by smoke from combustion of cellulosic materials, such as described herein.

It is an advantage of this invention that it requires no actual combustion or combustion apparatus and there is no attendant heat or sparks when it is used. It has been noted that extreme heat and/or sparks sometimes given off by conventional combustion type beesmokers may anger the bees and often incite a considerable percentage of them to attack the beekeeper. No such irritation occurs when the present invention is employed.

It is a still further advantage of this invention that it provides a small, convenient, self-contained unit for smoke application which does not have to be fueled and ignited each time it is used. It further requires no constant or periodic physical attention from the operator as is necessary, for example, in working the bellows in conventional smokers. It also eliminates any need for precautionary measures to prevent fire either during or after its use.

In a broad embodiment the invention comprises a pressurized package having a quick-acting valve, a spray nozzle, and generally has a dip-tube extending from the valve to a point adjacent the bottom of the container, and a solution comprising a minor proportion of a relatively high boiling liquid derived from the destructive distillation or incomplete combustion of cellulosic matter such as hardwood, straw, corn cobs and the like, dissolved and/or dispersed in a normally gaseous liquid propellant. Alternatively, the container may be of the type which can be inverted, having no dip-tube. Such containers and atomizing valves are known to the art.

Particularly suitable smoke-odor simulating components are the higher boiling components of soluble hard wood tar. The method of producing these tars is well known. Briefly, it comprises destructively distilling hardwood to produce charcoal, noncondensable gases and crude pyroligneous acid. This latter fraction is subjected to further distillation to remove most of the water and low boiling components such as methanol, acetic acid and certain other low boiling products including aldehydes, alcohols boiling above methanol, ketones, etc. The resultant tar may be further distilled to produce light tar oils and a residue of heavy wood tar oils and pitch. The wood tar oil may be used as such or may be further fractionally distilled to separate certain low boiling components and a rather viscous residue. Either the residue or the wood tar oils may be used in this invention. I have found that the unnecessary parts of the residue can be easily separated out by adding liquid Freons, which cause the separation of insoluble components.

The composition of the smoke-odor simulating component varies considerably depending upon a number of factors such as the type of cellulosic material employed. For example, the various hardwoods yield products differing in composition when destructively distilled under the same conditions. The conditions employed in the destructive distillation process also effect the composition, yet the effects of the varying compositions are strikingly similar and the varying compositions of wood tar are regularly referred to as if they were one true compound. A typical oil useful in the present invention contains about 60% tar acid components and has the properties shown in the following Table I.

*Table I.—Typical analysis*

Boiling range:
  1 B.P. _____ °C__ 88
  10% _____ °C__ 181
  20% _____ °C__ 229
  30% _____ °C__ 248
  40% _____ °C__ 262
  50% _____ °C__ 274
  60% _____ °C__ 293
  70% _____ °C__ 309
  80% _____ °C__ 317
Viscosity (Universal) _____ 62 sec. @ 50° C.
Acid as acetic_____ 3.0%
Caustic solubility_____ 60–75%
Moisture_____ Trace
Sp. gr. 15° C_____ 1.06 approx.
Flash point_____ 170° F.

The components of this material include methyl alcohol, n-propyl ketone, formic acid, traces of water, acetic acid, methyl pyruvate, propionic acid, acrylic acid, phenol, orthocresol, metacresol, paracresol, paraxylene, xylol, and guiacol, and other phenolic and non-phenolic compounds. In general the proportions of the lower boiling components listed above are small and these will vary depending upon the efficiency of the fractionation process employed in producing the oil. It appears to be desirable to have a small percentage, for example, up to 5–10% of these low boiling components present. It is important that the free-water content of the oil be low. In other words, the composition should be as nearly anhydrous as possible since the water is insoluble, or substantially so, in most of the solvent-propellants employed and may cause precipitation of some low boiling components if present.

It should be understood that the above described component is a particularly satisfactory one but it will be evident to one skilled in the art that the high boiling smoke-odor simulating component can be produced by a variety of methods and may vary in composition over a considerable range. The sum total effect of the varying compositions of wood tar are so strikingly similar that the term "wood tar" is regularly referred to in chemical writings as if it were a single and true compound. The same is true of the composition of its residues and higher-boiling components. For example, a suitable composition can be produced by collecting the tars resulting from incomplete combustion of hardwood or other cellulosic material, this being after all only another form of destructive distillation.

Numerous well known propellants may be employed. These embrace the propellants which are used in the so-called aerosol industry in connection with dispensing of sprays of insecticides, perfumes and the like. Particularly suitable are the so-called Freons or Genetrons, these being normally gaseous fluorinated or fluorochlorinated derivitives of low boiling hydrocarbons such as methane and ethane. In general these have a vapor pressure of 5 to 300 pounds per square inch. Typical of these are dichlorodifluoromethane, monochlorodifluoromethane, trichlorotrifluoroethane, trifluorodichloroethane, difluoromethane, difluoromonochloroethane, tetrafluoroethane, dichloromonofluoromethane. These may be used alone or in admixture which each other, or with monofluorotrichloromethane. The latter is not of itself a propellant at ordinary temperatures because of its relatively low vapor pressure. It is, however, useful both as a solvent for the smoke-odor simulating component and as a means of regulating the vapor pressure of the lower boiling propellants. A particularly useful composition is a 50–50 mixture of monofluorotrichloromethane and dichlorodifluoromethane. The latter component has a vapor pressure at 70° F. of about 70 pounds per square inch. The mixture, however, has a vapor pressure considerably lower and well within the limits set by the Post Office Department and the Interstate Commerce Commission's shipping regulations for the so-called beer-can aerosol packages. The proportion of suitable mixtures to produce propellants having the requisite vapor pressure to meet such regulations is well known in the art and need not be described in detail here. It should be understood that the vapor pressure limitations of the propellants are purely a function of the strength of the container.

Other normally gaseous propellants may be used either by themselves, or preferably in conjunction with the low boiling halogenated hydrocarbons just described. These include certain low boiling hydrocarbons such as propane, butane, isobutane, cyclobutane and other saturated or unsaturated acyclic or cyclic hydrocarbons containing 3 to 5 carbon atoms. It is likewise possible to use vinylchloride, methylbromide, ethylchloride, ethylnitrite and the like, particularly in admixture with the Freons and Genetrons. When such mixtures are employed the Freons and Genetrons are usually used as the major constituents of the propellant. Likewise, some of them serve to increase the solubility of the smoke-odor simulating component in the propellant. There is, of course, a certain fire hazard present when using propane and other low boiling hydrocarbons but this is considerably reduced when they are present as a minor constituent of the propellant mixture.

It is likewise within the scope of the invention to add other components which have a solubilizing effect on the smoke-odor simulating component. This may include higher boiling hydrocarbons such as naphtha, kerosene, light mineral oil, etc. It is difficult to place any limits on the amount of such solubilizing constituents because of the variable character of the smoke-odor simulating component.

The composition may contain from about 0.001% to about 10% of the smoke-odor simulating component. At the lower concentration the desired reaction on the bees is somewhat slow. At the higher concentration mentioned there is a possibility that the honey and wax may become contaminated if too much is sprayed into the hive. As a general proposition a solution containing from 0.5 to 2% of the smoke-odor simulating composition is the most practical and desirable. I have found that when using 97 to 99.5% of a 50–50 mixture of trichloromonofluoromethane and dichlorodifluoromethane, the remainder being the wood tar component described above, excellent results in "smoking" hives can be obtained. The bees react quickly and are best controlled in this range of components. At the same time there is little practical danger of contamination of the honey and wax, even though the beekeeper should use an excess of the composition over that required to accomplish the desired pacifying effect.

There are many containers and spray valves available on the market which constitute practical units from which to dispense this composition. The containers in general are made of metal such as tin or aluminum and they usually come in six or twelve ounce sizes, being of a gauge and construction such as to meet shipping regulations. The valves may be of metal or plastic and should have a nozzle of the type which releases an exceedingly fine spray, preferably one which forms or approaches a true aerocolloid so as to minimize settling of the particles on the comb. The so-called "beer-can" containers are particularly useful, but containers of heavier gauge capable of withstanding higher pressures may be used.

These containers can be filled by the well known methods. One method is to refrigerate the solution to subzero temperatures in large tanks and then measure the resultant solution into the container units, after which the valve and dip-tube assembly is inserted. This method has certain advantages, particularly when separating the smoke-odor simulating component from the materials insoluble in the propellant. Usually the amount of insoluble material is quite small. However, if this method is used and the solution is permitted to stand, a tarry substance may settle out and adhere to the surfaces of the tank. It is also possible to remove this substance by filtration.

However, since the amount of insoluble material is small the smoke-odor simulating component can be weighed or measured directly into the can, either as it is obtained or in the form of a highly concentrated solution, say 15–50% in a solvent, boiling well above atmospheric temperature. Such a solution may be in cleaners naphtha, solvent naphtha, benzene, toluene, xylene, kerosene, light mineral oil and the like. The refrigerated solvent-propellant may then be added next or else the valve is then inserted and the propellant-solvent is introduced under pressure and in measured amount through the valve. In some instances it is desirable to flush the air from the can with a small amount of propellant in gaseous form. This prevents undue oxidation and tar formation of the smoke-odor simulating component and also prevents undue increase in pressure over and above that of the vapor pressure of the propellant.

This latter method has the advantage that there is no need for refrigeration. The small amount of tar which may separate collects uniformly in a very thin layer over the walls of the container. In general, the amount of the tar which separates is too small to effect the operation of the discharge mechanism. In fact, it may have the advantage that the coating prevents corrosion of the metal container which may result for example when small amounts of moisture are present, along with small amounts of certain low boiling constituents such as formic or acetic acid.

In any event, I have used both methods successfully with the hardwood tar distillates which I prefer in this invention.

It should be understood that this invention is not to be interpreted as limited to the exact embodiments described but should include various modifications which will be apparent to one skilled in the art.

I claim as my invention:

1. A composition of matter consisting essentially of a liquefied, normally gaseous, halogenated, low molecular weight hydrocarbon and a smoke-odor simulating component comprising from about 0.1% to about 10% by weight of a portion of the substantially anhydrous product of the destructive distillation of woody material which is soluble in said halogenated hydrocarbon.

2. The composition of claim 1 wherein the woody material is hardwood.

3. The composition of claim 1 wherein the smoke-odor simulating component is hardwood tar oil.

4. The composition of claim 1 wherein the halogenated hydrocarbon contains at least one molecule of fluorine.

5. A process for separating components having the pacifying effect on bees of the natural smoke of burning woody materials which comprises mixing a liquefied, normally gaseous, halogenated, low boiling hydrocarbon having not more than two carbon atoms per molecule and containing at least one fluorine atom per molecule, with wood tar, separating the resultant solution from the insoluble portions of said tar, and maintaining said solution in liquid form.

6. The process of claim 5 wherein the wood tar is a hardwood tar.

References Cited in the file of this patent

UNITED STATES PATENTS

| | | |
|---|---|---|
| 1,892,750 | Rotheim | Jan. 3, 1933 |
| 2,440,915 | Roehr | May 4, 1948 |
| 2,535,177 | Volgenau et al. | Dec. 26, 1950 |

OTHER REFERENCES

The National Formulary, 7th edition, American Pharmaceutical Association, Washington, D.C., 1942, pages 105 and 106. (Copy in Division 43.)

The Merck Index, 6th edition, Merck & Company, Inc., Rahway, N.J., 1952, page 1010. (Copy in Div. 43.)